June 14, 1932.  W. P. HAMMOND  1,863,200
AUTOMATIC LUBRICATION
Filed Nov. 16, 1922
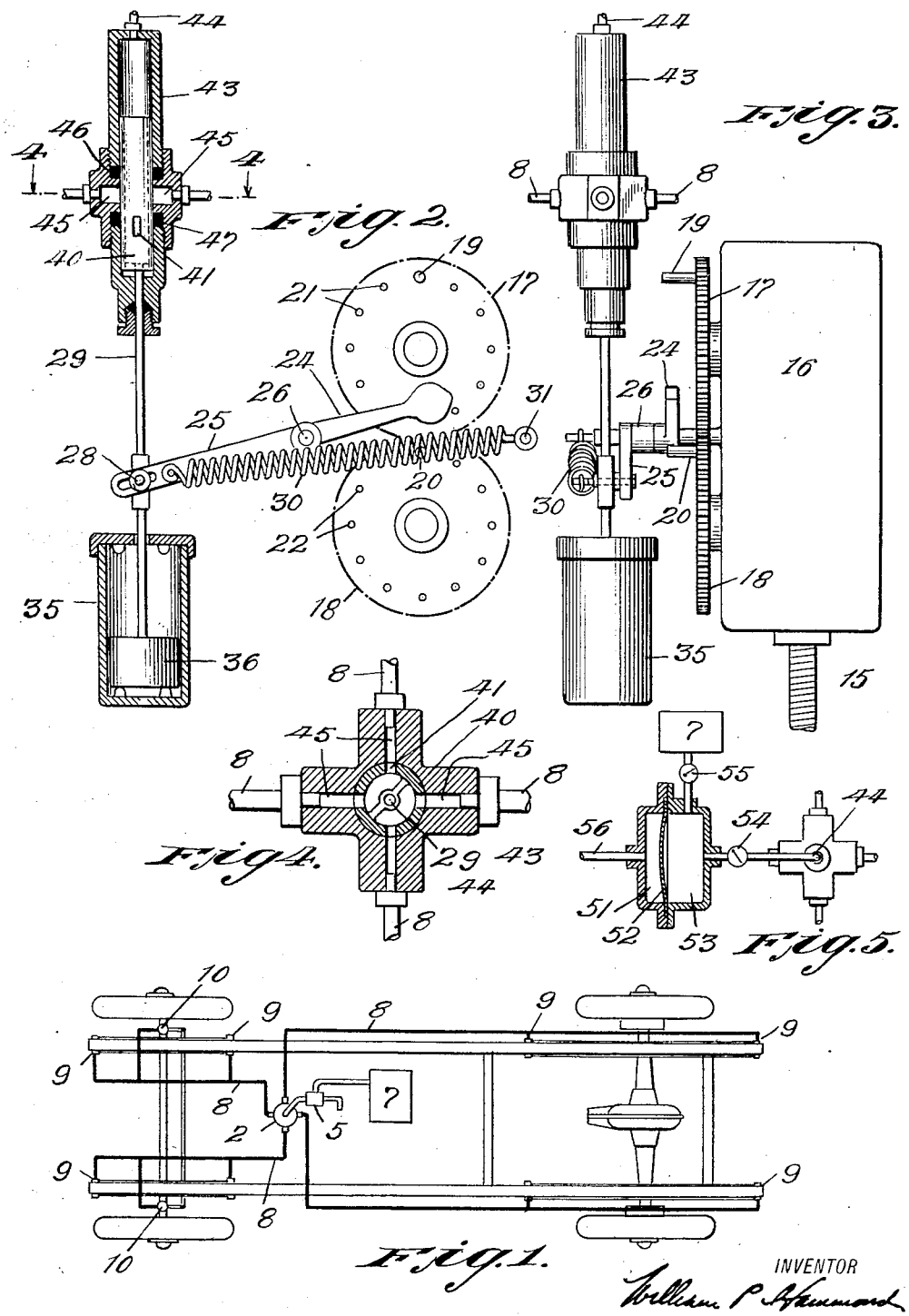
INVENTOR
William P. Hammond Patented June 14, 1932

1,863,200

UNITED STATES PATENT OFFICE

WILLIAM P. HAMMOND, OF EAST ORANGE, NEW JERSEY; LILLIAN LOUISE HAMMOND, THOMAS EDMUND HAMMOND, AND IRVING TRUST COMPANY, FORMERLY IRVING BANK COLUMBIA TRUST COMPANY, EXECUTORS OF SAID WILLIAM P. HAMMOND, DECEASED, ASSIGNORS TO LILLIAN LOUISE HAMMOND AND WILLIAM P. HAMMOND, JR.

AUTOMATIC LUBRICATION

Application filed November 16, 1922. Serial No. 601,251.

This invention relates to automatic lubrication and more especially to automatic lubricating systems for automobiles.

Automobile manufacturers have made a common practice of distributing charts and detailed instructions as to the lubrication of the chassis bearing parts after the machine has run a given distance and it is highly important that such lubrication be supplied at the proper period in the proper quantities.

It is the object of this invention to provide means for automatically supplying such lubrication at predetermined periods dependent upon the operation of the automobile, and with pre-determined quantities of lubricant adapted to supply the needs of the particular part without waste.

It is further the object of this invention to accomplish the above described lubrication without attention from the car operator and without the use of distributed, inaccessible and complicated parts, but to arrange the few simple parts compactly and at a point which will be easily reached when necessary without interfering with the functions of other automobile parts or with the comfort of the vehicle driver.

In the accompanying drawing, which serve to illustrate one mechanical means for accomplishing my purpose, like numerals have been applied to designate like parts throughout the several views.

Fig. 1 serves to show diagrammatically the complete improved system applied to an automobile chassis.

Fig. 2 is an enlarged view in partial section of the distributing mechanism indicated at 2 in Fig. 1.

Fig. 3 is a side elevation of the complete distributing mechanism.

Fig. 4 is a cross sectional view of the valve and valve body on line 4—4 of Fig. 2.

Fig. 5 is a view partly in section showing a pumping arrangement.

In the complete system disclosed in Fig. 1, a lubricant reservoir 7 communicates through such means as a pump 5 with the distributing mechanism 2 from which tubes 8 lead to the points requiring lubrication, such as the spring hangers 9 and the steering spindles 10.

It will be understood that a multiplicity of tubes 8 and branches thereof may communicate with many other chassis points which require lubrication, but for simplicity and clearness in the drawing only a small number of such tubes have been shown.

The tubing connections employed are those standard to the automobile industry and description of these tubes and their connections will not be attempted as any suitable tubing, pipe, or connection may be used for the purpose of conducting the lubricant distributed, to the part requiring lubrication.

The distributing mechanism, shown in Figs. 2, 3 and 4, is driven from a branch 15 of the speedometer shaft, or a shaft connection with the wheels, axles or transmission which moves in direct proportion to the distance which the automobile travels.

Reduction gearing of any suitable form is arranged in a gear box 16. This reduction gearing drives two intermeshing gears 17 and 18 which carry removable pins 19 and 20 which may be inserted in any desired hole 21 or 22 to adjust the relation of the pins to each other and to the trip lever arm 24. The trip lever comprises two arms 24 and 25 pivoted at point 26. The arm 25 is provided with a slotted yoke which engages a pin 28 in the stem 29 of the sleeve valve 40.

A spring 30 is attached at one end to the arm 25 and at its other end to a stationary projection 31 in line with the pivot point 26 of the trip lever 24, 25. The toggle action of spring 30 causes a pull upon lever arm 25 and assures that the valve 40 will always be drawn to the limit of its travel and not stop at an intermediate point.

To regulate the speed at which spring 30 will move valve 40, a plunger 36 working in a dashpot 35 is attached to the lower end of valve stem 29. The valve 40 which preferably takes the form of a hollow sleeve provided with valve ports 41, slides within the valve casing 43. Valve casing 43 is provided with an oil inlet connection 44, and oil outlet ports 45 connecting with the distributing tubes 8. The sleeve valve 40 is made tight by packings 46 and 47, above and below outlet ports 45. When the valve 40 is in its highest, and lowest positions, its ports 41 have passed the packings 46 and 47 and no oil is discharged through outlet ports 45 to the chassis parts. When the valve 40 is at, and near, its central position, the valve port 41 is open to the outlet ports 45 and provides egress for the oil from the hollow central passage in the valve sleeve 41 to the chassis parts. Thus the time of oil egress is dependent upon the time the port 41 takes to pass between packings 46 and 47, which time is dependent on the adjustment of dashpot 35. A predetermined adjustable quantity of lubricant is thus supplied at each valve operation, whether a downward or upward stroke. Since dashpot 35 is double acting, the time of valve operation may be the same in either direction, or if desired, one end of the dashpot 35 may be adjusted independently of the other, and either the upward or downward valve stroke made longer or shorter than the reverse stroke, to discharge a greater or less quantity of lubricant.

To secure a positive feed to each chassis bearing (such as hangers 9 and spindles 10) it is preferable to provide a pumping means to force the lubricant to each part and it will be understood that any suitable pump might be employed. Fig. 5 discloses an improved and simple form of pump which serves to feed the lubricant and which dispenses with mechanical and electrical parts. The pump 5 is divided into two compartments 51 and 53 separated by the flexible diaphragm 52. The compartment 53 connects through a check valve 55 to the reservoir 7, and through a check valve 54 with the oil inlet connection 44 of the distributing valve 2. The compartment 51 is connected, by such means as a tube 56, with a cylinder of the automobile engine. The alternate suction and pressure occurring in the automobile engine cylinder causes the diaphragm 52 to vibrate, alternately increasing and decreasing the volume of chamber 53. Increase of the volume of chamber 53, reduces the pressure therein and causes check valve 55 to open admitting lubricant from reservoir 7. Decreasing the volume of chamber 53 increases the pressure of the lubricant it contains and forces part of it out through check valve 54 to the distributing valve 2 and to the chassis parts when the valve 2 is in its open position.

The operation of the complete device is entirely automatic. Referring to Fig. 3, the shaft 15 is driven from the speedometer, or from other convenient driving point on the automobile running gear such as the wheels, axles or transmission and in turn through the reduction gearing 15, drives the pin gears 17 and 18 carrying the pins 19 and 20. When one of these pins comes in contact with the end of the arm 24 and forces this arm across the centerline of pivot 26, the spring 30 acts to force stem 29 and its attached valve 40 to the end of its stroke against the dashpot 35, as the gears 17 and 18 revolve further the other pin engages the end of arm 24 and forces it across the centerline of pivot 26 in the opposite direction to that previously described, spring 30 again acts to force the valve 40 to the opposite end of its stroke. These actions are repeated as the vehicle completes the required mileage to again bring one of the pins 19 or 20 into contact with arm 24. Pins 19 and 20 may be adjusted in their relation to each other, and to the gears 17 and 18, by inserting them in any of the holes 21 and 22. More than one pin may be inserted in each gear if it is desired to cause valve 40 to operate more than twice to each revolution of gears 17 and 18. By adjusting these pins the frequency of the lubricant supply period may be adjusted, while by adjusting dashpot 35, the duration of each period may be adjusted. Adjustment is thus provided for the distance the automobile shall travel before lubrication is applied, and for the quantity of lubricant which shall be distributed at each application.

The pump 5 is automatic in its operation in that when valve 2 is closed the pressure increases in chamber 53 until the diaphragm 52 is held stationary and cannot respond to the lower engine pressure. When the pressure in chamber 53 is released by the opening of valve 2, the diaphragm 52 again responds to engine pressure changes and pumping is resumed.

It will be evident that means have been provided for forcing lubricant to each chassis bearing, that such means is positive, automatic, and simple in construction and in operation, requiring no changes in the automobile structure and being of such nature as to be readily adaptable to any motor vehicle and adjustable to the varying condition of the vehicle parts and the lubricant employed.

It will also be clear that many changes may be made in the arrangement of the elements of the combination, in the elements themselves and that many different modifications and changes may be made without departing from the spirit of the invention which is claimed.

What I claim is:

1. The automobile chassis lubricating system which comprises a lubricant reservoir, a pump actuated by the pressure changes in the cylinders of the automobile engine, a distributing valve actuated by the automobile speedometer drive shaft and tubing connections from the distributing valve to the chassis bearings.

2. The automobile chassis lubricating system which comprises a lubricant reservoir, a flexible diaphragm, a distributing valve and distributing tubes, said reservoir communicating with one side of the diaphragm, the opposite side of said diaphragm communicating with the explosion space in the automobile engine to cause the changes in engine pressure to force the oil through the distributing valve and tubes, and means to actuate the valve depending on the mileage of the automobile to permit lubricant to pass through the distributing tubes.

3. A lubricating system comprising a bearing to be lubricated, a lubricant supply reservoir connected therewith, a feeding-in control device therefor, and a speedometer mechanism governing both the cut-on and the cut-off of said device.

In testimony whereof I have affixed my signature to this specification.

WILLIAM P. HAMMOND.